United States Patent [19]

Ko

[11] Patent Number: 5,950,037
[45] Date of Patent: Sep. 7, 1999

[54] IMAGE FORMING APPARATUS WITH POWER CONSERVATION IN ACCORDANCE WITH AMBIENT LIGHT

[75] Inventor: Chang-Kyung Ko, Suwon, Rep. of Korea

[73] Assignee: SamSung Electronics Co., Ltd., Suwon, Rep. of Korea

[21] Appl. No.: 08/768,623

[22] Filed: Dec. 18, 1996

[30] Foreign Application Priority Data

Dec. 19, 1995 [KR] Rep. of Korea ............ 95-51960

[51] Int. Cl.$^6$ ................................ G03G 15/00
[52] U.S. Cl. ............................................ 399/38
[58] Field of Search ............................ 399/1, 38, 70

[56] References Cited

U.S. PATENT DOCUMENTS

| 4,967,212 | 10/1990 | Manabe et al. ............ 346/160 |
| 4,967,284 | 10/1990 | Yoshida et al. ............ 358/300 |
| 5,134,427 | 7/1992 | Akiyama et al. ............ 399/371 X |
| 5,191,362 | 3/1993 | Ichikawa ............ 399/44 X |
| 5,241,349 | 8/1993 | Nagasaka ............ 399/70 |
| 5,489,935 | 2/1996 | Dornier ............ 399/70 X |

FOREIGN PATENT DOCUMENTS

| 58-54332 | 3/1983 | Japan . |
| 5-327959 | 12/1993 | Japan . |

OTHER PUBLICATIONS

English Abstract for Japanese Publication 58–54332, Ushio et al. Patent Abstracts of Japan P204, vol. 7, No. 138, Jun. 16, 1983.

English Abstract for Japanese Publication 5–327959, Osaka, Patent Abstracts of Japan E1523, vol. 18, No. 152, Dec. 10, 1993.

Primary Examiner—William Royer
Attorney, Agent, or Firm—Robert E. Bushnell, Esq.

[57] ABSTRACT

There is disclosed an image forming apparatus using electrophotography including an interface unit allowing the image forming apparatus to be in continual electrical communication with an external data input system; a photodetector for sensing the level of brightness in a room in which the apparatus is located, and generating a signal corresponding thereto; a printing unit having driving mechanisms for paper conveyance and printing, and carrying out a power conservation mode and printing operations; and a controller for controlling the overall operations of the image forming apparatus, electrically communicating with the external data input system by way of the interface unit, and establishing a power conservation mode in which power consumption is lower than that of a standby mode, on receiving a signal reporting that the level of brightness in the room is lower than a standard brightness preset in the system, from the photodetector.

16 Claims, 4 Drawing Sheets

IMAGE FORMING APPARATUS WITH POWER CONSERVATION IN ACCORDANCE WITH AMBIENT LIGHT

CLAIM OF PRIORITY

This application makes claims all benefits accruing under 35 U.S.C. §119 from an application for *IMAGE FORMING APPARATUS USING ELECTROPHOTOGRAPHY SYSTEM AND POWER CONSERVATION METHOD THEREFOR* earlier filed in the Korean Industrial Property Office on Dec. 19, 1995 and there duly assigned Ser. No. 51960/1995.

BACKGROUND OF THE INVENTION

1. Field of the Invention

The present invention relates generally to an image forming apparatus with power consumption control. More particularly, the present invention relates to an image forming apparatus for controlling power consumption according to the level of ambient brightness, and further relates to a power conservation mechanism for an image forming apparatus.

2. Description of the Related Art

Typically, electrostatic image forming apparatuses such as laser beam printers and facsimile machines maintain fusing temperatures that are nearly actual printing temperatures. This occurs even in a standby mode. Thus, an image forming apparatus may take more time to set up for printing than to perform the actual printing itself. Such an image forming apparatus is heated to a prescribed temperature during the standby mode. This causes unnecessary power consumption. For this reason, various power conservation mechanisms have been proposed in order to solve this problem. One attempt to solve this problem is a power management system as disclosed in the Korean Patent Application No. 93-9498 filed by the same assignee as in the present invention. Among exemplars of the related arts is Ichikawa (U.S. Pat. No. 5,191,362, *Electrophotographic Printing Apparatus With A Control System Responsive To Temperature Changes*, Mar. 2, 1993) discussing an electrophotographic printing apparatus having a photosensitive member electrified in a printing operation, wherein unnecessary electrical charges are removed from the photosensitive member before the next printing operation. Akiyama et al. (U.S. Pat. No. 5,134,427, *Image Forming Apparatus*, Jul. 28, 1992) discusses a recording apparatus having a recording unit for recording information onto a recording medium, a feeder for feeding the recording medium to the recording unit, a detector between the recording unit and the feeder for detecting the recording medium being fed, and a controller for inhibiting the recording operation of the recording unit when the detector detects the recording medium before the elapse of a predetermined period of time from the start of the feeding operation of the feeder. Yoshida et al. (U.S. Pat. No. 4,967,284, *Image Forming Apparatus And Method Of Controlling Output Of Semiconductor Laser*, Oct. 30, 1990) discusses an image forming apparatus having a control device for controlling an optical output of a semiconductor laser. An operation of controlling the optical output is started with a timing before an incoming signal which indicates an effective image region in a sub scanning direction of a photosensitive body and responsive to a timing signal having a predetermined period. Manabe et al. (U.S. Pat. No. 4,967,212, *Image Recorder*, Oct. 30, 1990) discusses an image recorder of the kind using an electrophotographic procedure, which is capable of producing a clear-cut image having predetermined line width at all times with no regard to its operating conditions and ambient conditions by causing the line width of an image into coincidence with a predetermined reference width.

SUMMARY OF THE INVENTION

Accordingly, an object of the present invention is to provide an improved image forming apparatus with power consumption control.

Another object of the present invention is to provide an improved image forming apparatus for controlling power consumption.

A further object of the present invention is to provide an improved image forming apparatus using an electrophotography system for controlling power consumption.

A still further object of the present invention is to provide an improved image forming apparatus using an electrophotography system for controlling power consumption according to the level of brightness in a room.

Another object of the present invention is to provide an improved power conservation mechanism for an electrostatic image forming apparatus.

Another object of the present invention is to provide an improved image forming apparatus using an electrophotography system and using a power conservation mechanism.

Another object of the present invention is to provide an image forming apparatus using an electrophotography system which performs a power-saving function for minimizing power consumption when the level of brightness in a room, in which the system is located, is lower than a standard brightness preset in the system.

Another object of the present invention is to provide a power conservation mechanism for an image forming apparatus using an electrophotography system and having a photodetector for sensing the level of brightness in a room in which the system is located.

To achieve one or more of the above objects, the present invention discloses an image forming apparatus using an electrophotography system including an interface unit allowing the image forming apparatus to be in continual electrical communication with an external data input system. The system may further include: a photodetector for sensing the level of brightness in a room in which the system is located, and generating a signal corresponding thereto; a printing unit having driving mechanisms for paper conveyance and printing, and operation in a power conservation mode; and a controller for controlling the overall operations of the image forming apparatus, electrically communicating with the external data input system by way of the interface unit, and establishing a power conservation mode in which power consumption is lower than that of a standby mode, on receiving a signal reporting that the level of brightness in the room is lower than a standard brightness preset in the system, from the photodetector.

According to an another aspect of the present invention, there is disclosed a power conservation method for an image forming apparatus using an electrophotography system and having a photodetector sensing the level of brightness in a room where the system is located. The method includes the steps of determining if a printing command is input in a standby mode; when the printing command is not input, detecting if the level of brightness in the room is higher than a standard brightness preset in the system by using the photodetector; and when the level of brightness in the room is lower than the standard brightness, performing a power-saving function by operating the image forming apparatus from the minimum amount of power lower than that of the standby mode.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings.

According to a power conservation mechanism of the contemporary practice, when there is no printing operation for a period of time a user specifies while an image forming apparatus is in on-line state or ready-to-print state, the temperature of a heater lamp inside the system's engine unit is reduced to a predetermined point. In a situation that there is a command to start printing operations, the system wakes up for the actual printing. Such an image forming apparatus of the contemporary practice that has been in standby mode performs a power-saving function in a predetermined period of time. This causes printing delay. In addition, when a user turns off the light of a room in which the image forming apparatus is placed and leaves the room without powering the system off, unnecessary power consumption is created by the system.

Figure 1:
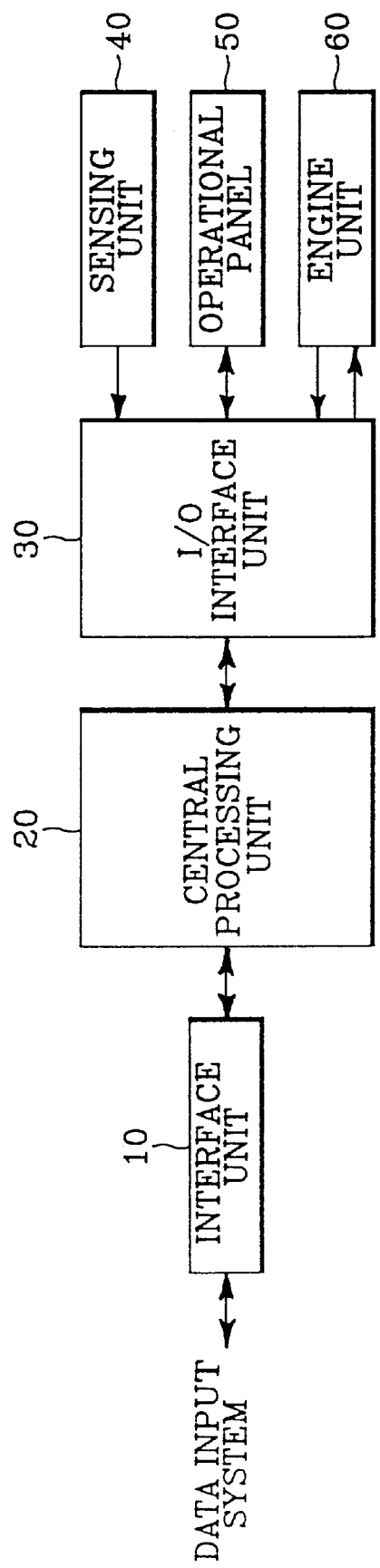
FIG. 1 is a block diagram of an image forming apparatus using an electrophotography system, built in accordance with the principles of a first preferred embodiment of the present invention.

FIG. 1 is a block diagram of an image forming apparatus using an electrophotography system in accordance with the principles of a first preferred embodiment of the present invention. The inventive image forming apparatus includes an interface unit 10 which enables the image forming apparatus to electrically communicate with an external data input system (e.g. a host computer), a controller 20 which is in continual electrical communication with the external data input system by interface unit 10 to control an engine unit 60 according to various commands that are input to the system by using an operation panel 50 and perform various operations, and an input/output (I/O) interface unit 30 which is connected between the controller 20, a sensing unit 40, operation panel 50, and engine unit 60 so as to interface input/output signals of the controller 20.

In this image forming apparatus, sensing unit 40 actuates sensors such as a photodetector and actuates sensors used for sensing the operating state of the components, the state of paper conveyance, the amount of toner and the level of brightness in a room where the system is located, and applies output signals of the sensors to the controller 20 through I/O interface unit 30. Operation panel 50 includes a key input unit and a display. The key input unit has a set of keys used for mode selections and various operations according to a selected mode, and the display displays various messages during operation and programming. Engine unit 60 includes driving mechanisms used for paper conveyance and printing, and allows a printing operation under the control of the controller 20.

Figure 2:
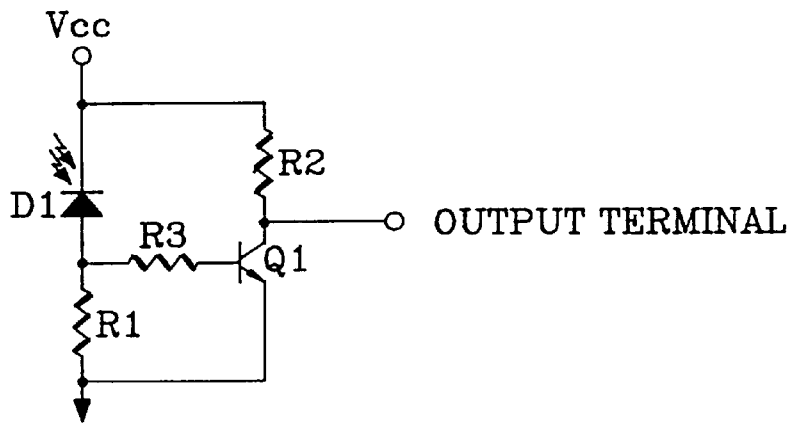
FIG. 2 illustrates a photodetector inside a sensing unit in FIG. 1, built in accordance with the principles of a first preferred embodiment of the present invention.
Figure 3:
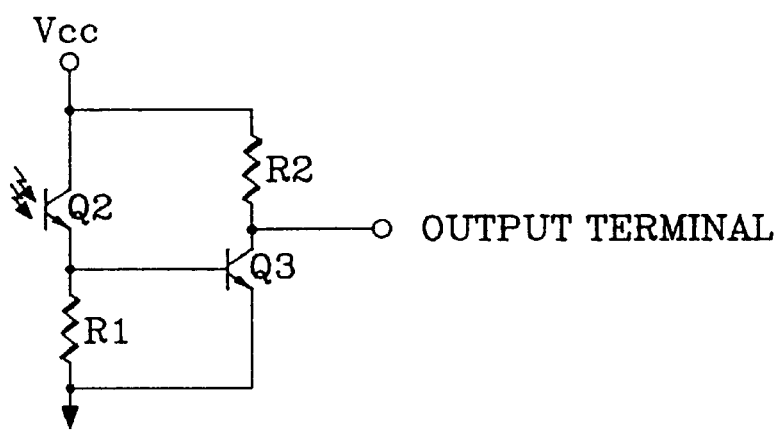
FIG. 3 illustrates a photodetector inside a sensing unit in FIG. 1, built in accordance with the principles of a second preferred embodiment of the present invention.

The photodetector of sensing unit 40 may comprise a phototransistor or photodiode. FIGS. 2 and 3 respectively show photo-detectors constructed in accordance with first and second preferred embodiments of the present invention. The photodetector may have resistors R1, R2 connected via transistors Q1 (FIG. 2) or Q3 (FIG. 3). FIG. 2 illustrates having a resistor R3 connected to a Vcc via a diode D1.

Figure 4A:
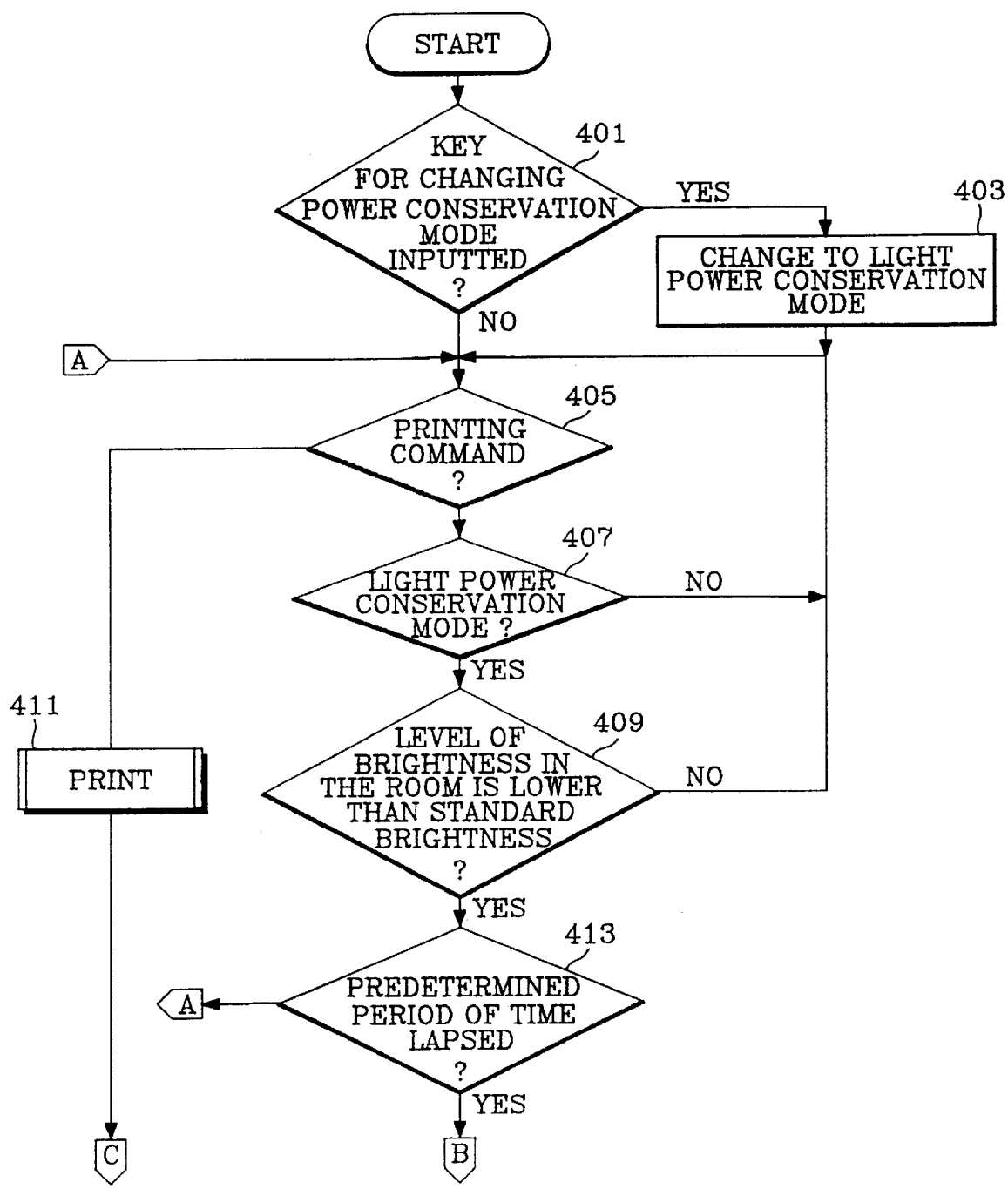
FIGS. 4A and 4B show the flowcharts for describing a power-saving process of the present invention.
Figure 4B:
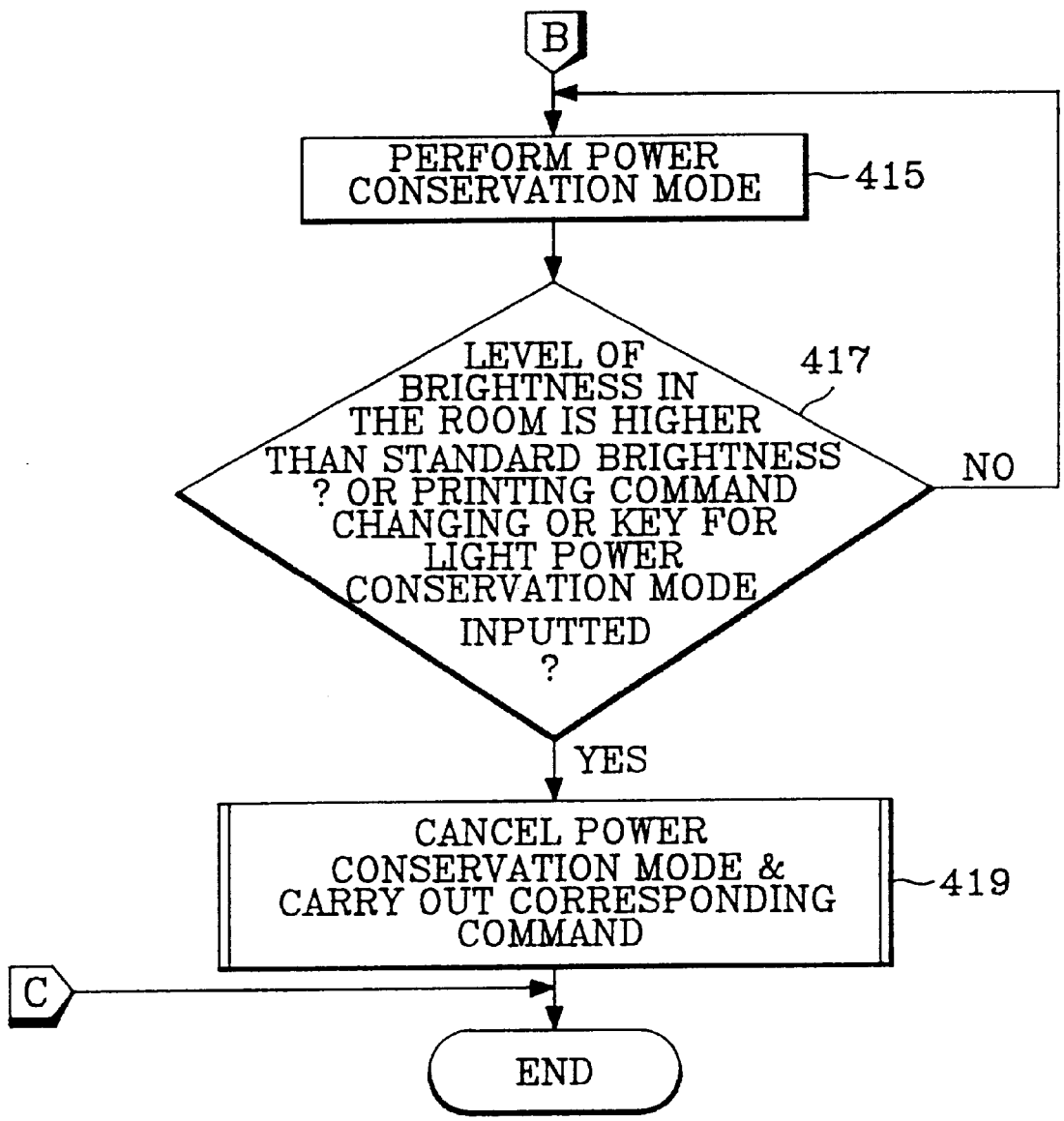

FIGS. 4A and 4B show the flow chart for describing the power-saving process of the present invention. The operation of the present invention is now described in detail with reference to FIGS. 4A and 4B.

Referring to FIGS. 4A and 4B, the controller 20 controls engine unit 60 to raise the fusing temperature within engine unit 60 to a point of a standby mode, and maintains the standby mode. At step 401, the controller 20 detects if a key for changing to power conservation mode is input. When the controller 20 determines that there exists the key input for changing to power conservation mode, the controller 20 reverses, at step 403, the current state of establishing a power conservation mode. If there is a key input for power conservation mode change at the time of establishing a power conservation mode, the controller 20 cancels the power conservation mode of the system at step 403. In case that the key input for power conservation mode change exists at the time of canceling the power conservation mode, the controller 20 sets a power conservation mode of operation at step 403.

At step 405, the controller 20 determines if there is a print command. When there is the print command, the controller 20 performs a printing operation corresponding to the print command at step 411. If the print command is not issued, the controller 20 determines, at step 407, if the current mode of operation is a power conservation mode. When the system is in the power conservation mode, the controller 20 detects if the level of ambient brightness in a room, in which the system is located, is lower than a standard brightness preset in the system. When a photodiode D1 or phototransistor Q2 detects that the level of brightness in the room is higher than the standard brightness preset in the system, each of them outputs a signal attaining a low level through its output terminal. When the level of brightness in the room is lower than the standard brightness, the counting operation starts, and the controller 20 determines, at step 413, if a predetermined period of time lapses according to the counting operation. When the predetermined period of time does not lapse, the controller 20 returns to step 405, stands ready for a lapse of the predetermined period of time, and repeats the procedure of steps 405 to 413. If there is a print command or a key input for changing to power conservation mode while the controller 20 is standing ready for the lapse of the time, it resets the time and performs corresponding operations according to the command or key input. If the controller 20 determines, at step 413, that the predetermined period of time lapses, it allows a power conservation mode of operation at step 415. One of conventional techniques may be applied to such a power conservation mode, which is disclosed in Korean Patent Application No. 93-9498.

At step 417, the controller 20 detects if the level of ambient brightness in the room is higher than the standard brightness, if there is a print command, or if there is a key input for changing to different power conservation mode.

When the controller 20 determines that there is one of them, e.g. when the controller 20 determines that there is the print command, it wakes the power conservation mode up at step 419, and performs the corresponding procedure according to the print command.

As described above, the inventive image forming apparatus carries out a power conservation mode of operation when the level of brightness in a room, in which the system is located, is lower than a standard brightness preset in the system. The apparatus reduces the possibility of unnecessary power consumption due to careless handling.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An image forming apparatus using an electrophotography system, comprising:

an interfacing circuit connected to an external data input system for generating data input signals;

an operational panel comprising a plurality of discrete keys that are independently operable by manual depression by a user to control operation of said image forming apparatus;

a photodetecting circuit for sensing an ambient brightness level of said image forming apparatus;

a printing mechanism for performing printing operations; and a controller for controlling operation of said image forming apparatus, and reducing power consumption by maintaining said image forming apparatus in a standby mode after initialization, switching to a power conservation mode of driving said image forming apparatus with electric power lower than electric power required for maintaining said image forming apparatus in said standby mode in response to a key input from said operational panel requesting a switch-over to said power conservation mode, determining whether said ambient brightness level of said image forming apparatus sensed by said photodetecting circuit exceeds a predetermined level and whether a print command is input via said operational panel, and maintaining said image forming apparatus in said power conservation mode until occurrence of any one of when the ambient brightness level of said image forming apparatus sensed by said photodetecting circuit exceeds said predetermined level and when said print command is input via said operational panel.

2. An image forming apparatus, comprising:

an interfacing circuit connected to an external data input system for generating data input signals;

an operational panel comprising at least a key requesting a switch-over to a power conservation mode;

an ambient sensor for sensing an ambient brightness level of said image forming apparatus, and generating a brightness signal when said ambient brightness level exceeds a standard brightness level preset for said image forming apparatus;

printing and driving mechanisms for paper conveyance and printing, while performing operations during said power conservation mode in which power consumption is lower than power consumption of a standby mode; and a controller for controlling operation of said image forming apparatus, changing operation of said image forming apparatus in said power conservation mode when said key requesting said switch-over to said power conservation mode is input via said operational panel, and maintaining operation of said image forming apparatus in said power conservation mode in dependence upon said brightness signal.

3. The image forming apparatus of claim 2, further comprised of said controller further:

determining whether a print command is input via said operational panel during said standby mode;

when said print command is not input, detecting whether said ambient brightness level of said image forming apparatus in a room is higher than said standard brightness level preset for said image forming apparatus; and when said ambient brightness level of said image forming apparatus in the room is lower than the standard brightness, maintaining operation of said image forming apparatus in said power conservation mode.

4. The image forming apparatus of claim 3, further comprised of said controller determining whether said key requesting said switch-over to said power conservation mode is input via said operational panel prior to changing operation of said image forming apparatus to said power conservation mode, when said key is input via said operational panel.

5. The image forming apparatus of claim 3, further comprised of said controller further:

detecting whether a key for changing to a release mode in which power consumption is lower than power consumption of said standby mode is input via said operational panel; and when said key is input via said operational panel, changing operation to said release mode.

6. The image forming apparatus of claim 3, wherein said image forming apparatus consumes a minimum level of power when no print command is input via said operational panel for a predetermined time period.

7. The image forming apparatus of claim 6, wherein said predetermined time period is reset when either the ambient brightness level of said image forming apparatus in the room is higher than the standard brightness level preset for said image forming apparatus, or a print command is input via said operational panel, or a key for changing to a different power mode is input via said operational panel.

8. The image forming apparatus of claim 3, further comprised of said controller performing a wake-up operation to enter said standby mode, when either the ambient brightness level of said image forming apparatus in the room sensed by said ambient sensor is higher than the standard brightness level preset for said image forming apparatus while said image forming apparatus is in said power conservation mode, or a print command is input via said operation panel while said image forming apparatus is in said power conservation mode, or a key for changing to a different power mode is input via said operational panel while said image forming apparatus is in said power conservation mode.

9. The image forming apparatus of claim 3, further comprised of said controller performing a wake up operation to enter said standby mode, when either the ambient brightness level of said image forming apparatus in the room sensed by said ambient sensor is higher than the standard brightness, or when a print command or a key for changing to a different power mode is input while said image forming apparatus is in said power conservation mode.

10. The image forming apparatus of claim 3, further comprising an electrophotography system for forming a toner image on a printable medium during each printing operation.

11. The image forming apparatus of claim 3, further comprised of said ambient sensor comprising a photodetector for sensing the ambient brightness level of said image forming apparatus in the room.

12. A power conservation method for an image forming apparatus, comprising the steps of:

determining whether a key requesting a switch-over to a power conservation mode is input via an operational panel;

when said key requesting said switch-over is input via said operational panel, changing operation to said power conservation mode;

determining whether a print command is received from said operational panel;

when said print command is not received, determining whether an ambient brightness level in a room is lower than a standard brightness level preset in said image forming apparatus; and when the ambient brightness level in the room is lower than the standard brightness level, maintaining operation of said image forming apparatus in said power conservation mode at a minimum level of power consumption lower than power consumption required during a standby mode.

13. The power conservation method of claim 12, wherein said image forming apparatus consumes at a minimum level of power when no print command is input via an operational panel for a predetermined time period.

14. The power conservation method of claim 13, wherein said predetermined time period is reset when either the ambient brightness level in the room is higher than the standard brightness level, or when a print command or a key for changing to a different power mode is input via said operational panel while said image forming apparatus is in said power conservation mode.

15. The power conservation method of claim 12, further comprising the steps of:

performing a wake-up operation to enter said standby mode, when either the ambient brightness level in the room is higher than the standard brightness level during said power conservation mode, or when a print command or a key for changing to a different power mode is input via said operational panel while said image forming apparatus is in said power conservation mode.

16. A power conservation method for an image forming apparatus, said method comprising the steps of:

determining whether a key requesting a switch-over to a power conservation mode is input via an operational panel with power consumption lower than power consumption of a standby mode;

when said key is input via said operational panel, changing operation to the power conservation mode;

determining whether a print command is received during said standby mode;

when no print command is received, determining whether a current mode of operation is the power conservation mode;

when the current mode of operation is the power conservation mode, detecting whether a level of brightness in a room is higher than a standard brightness;

when the level of brightness in the room is lower than the standard brightness, detecting a lapse of a predetermined time period;

when the level of brightness in the room is lower than the standard brightness and no print command is received during said predetermined time period, performing a power saving function by operating said image forming apparatus at a minimum level of power consumption lower than power consumption during said standby mode; and carrying out a wake-up operation to enter said standby mode, when either said image forming apparatus detects that the level of brightness in the room is higher than the standard brightness during the power conservation mode, or when said image forming apparatus detects that said print command is received during the power conservation mode, or when said image forming apparatus detects that said key requesting said switch-over to the power conservation mode is input via said operational panel.

* * * * *